(12) United States Patent
Shlyak et al.

(10) Patent No.: US 8,199,199 B1
(45) Date of Patent: Jun. 12, 2012

(54) METHOD AND SYSTEM FOR REAL TIME JUDGING BOUNDARY LINES ON TENNIS COURT

(76) Inventors: Yuriy Shlyak, Chicago, IL (US);
Vladimir Komarov, Buffalo Grove, IL (US)

( * ) Notice: Subject to any disclaimer, the term of this patent is extended or adjusted under 35 U.S.C. 154(b) by 1297 days.

(21) Appl. No.: 11/839,530

(22) Filed: Aug. 15, 2007

(51) Int. Cl.
*H04N 7/18* (2006.01)

(52) U.S. Cl. ........ 348/157; 473/467; 382/194; 382/106; 382/312; 382/100

(58) Field of Classification Search .................. 382/100, 382/312, 106, 194; 473/467
See application file for complete search history.

(56) References Cited

U.S. PATENT DOCUMENTS

| | | | | |
|---|---|---|---|---|
| 3,982,759 | A * | 9/1976 | Grant | 473/467 |
| 4,004,805 | A * | 1/1977 | Chen et al. | 473/467 |
| 5,082,263 | A | 1/1992 | Berger | |
| 5,303,915 | A | 4/1994 | Candy | |
| 5,489,886 | A | 2/1996 | Wexler | |
| 5,800,292 | A * | 9/1998 | Brace | 473/467 |
| 6,233,007 | B1 | 5/2001 | Carlbom | |
| 6,816,185 | B2 | 11/2004 | Harmath | |
| 2002/0118861 | A1 * | 8/2002 | Jouppi et al. | 382/103 |
| 2002/0122115 | A1 * | 9/2002 | Harmath | 348/157 |
| 2003/0073518 | A1 * | 4/2003 | Marty et al. | 473/416 |
| 2006/0007322 | A1 * | 1/2006 | Nakamura et al. | 348/222.1 |
| 2006/0039584 | A1 * | 2/2006 | Aichi | 382/107 |
| 2006/0252017 | A1 * | 11/2006 | Vorozhtsov et al. | 434/247 |
| 2006/0287140 | A1 * | 12/2006 | Brandt et al. | 473/467 |
| 2007/0026974 | A1 * | 2/2007 | Marty et al. | 473/467 |
| 2010/0279801 | A1 * | 11/2010 | Rodengen et al. | 473/467 |

OTHER PUBLICATIONS

M. Fischetty, "In or Out?", Scientific American, Jul. 2007, p. 96-97, vol. 297 No. 1, USA.

* cited by examiner

*Primary Examiner* — Wing Chan
*Assistant Examiner* — Kostas Katsikis

(57) ABSTRACT

There is provided a method and a system for registration of real time position of tennis ball relatively to boundary lines on tennis court. The method and system comprise sensitive to near-infrared radiation at least one video camera, outputting video image of court and the method and system further include at least one point source of near-infrared radiation, illuminating tennis court and displaced relatively to the video camera. It is suggested a simple and inexpensive way of determining if a tennis ball bounces in or out of court by determining point of intersection of trajectories of the tennis ball and its shade from near-infrared radiation and comparing the position of the determined point of intersection with previously calibrated boundary lines of court.

2 Claims, 3 Drawing Sheets

METHOD AND SYSTEM FOR REAL TIME JUDGING BOUNDARY LINES ON TENNIS COURT

FIELD OF THE INVENTION

The present invention relates to a method and system for locating moving objects in sporting events, such as tennis, and specifically to real time judging boundary lines on a tennis court by location of bouncing points of a tennis ball relative to boundary lines of the court for automatic officiating of the game.

BACKGROUND OF THE INVENTION

Sporting games involving rules around boundaries depend on the decisions of human judges or players themselves (for amateurs). For example, in tennis one needs to trace a position of a relatively small (approximately 6.5 cm in diameter) tennis ball, often traveling at relatively high speed (up to 65 msec) over a relatively large area of tennis court (24 m long by 11 m wide). Human errors of judging positions of tennis ball relative to boundary lines of court are inevitable.

Due to details previously mentioned, it is crucial to build a commercially viable system for automatic judging of boundary lines for tennis courts.

There have been known attempts to develop and patent such a system.

For example, U.S. Pat. No. 5,303,915 of Candy et al. describes a system, in which positions of bouncing of tennis ball are defined by interaction of special conductive tennis ball with electrical coils, buried beneath surface of a court.

Other system according to the U.S. Pat. No. 5,082,263 of Berger includes location of special tennis ball, equipped reflective elements, by radar.

Both above mentioned systems are not acceptable, because they demand change of standard equipment of the game (tennis ball or surface of court).

There are also systems, not demanding change in standard equipment of game and using video cameras for remote location of a tennis ball.

One such a system (U.S. Pat. No. 5,489,886 of Wexler et al.) uses up to 30 video cameras, situated along boundary lines of court and other places. Its major complexities have deemed this system unviable.

Other such system (U.S. Pat. No. 6,233,007 of Carlbom et al.) suggests using pairs of video cameras for stereo 3-Dimensional location of tennis ball. This system demands quite complex processing of stereo images and needs, evidently, an abundance of video camera's pairs for reliable working (which in turn make it complex and expensive).

Another such a system (described by M. Fischetty in article "In or Out?" in Scientific American, July 2007, pp. 96-97) named "Hawkeye" and widely used in major tennis tournaments (and broadcastings) is comprised of 10 video cameras and 14 computers for 3-Dimensional location of tennis ball. The system is very complex, requires large processing power and complicated software, and of course is very expensive (setup and operation cost is up to $50000 a week per court). This system of course is not affordable for numerous non professional tennis clubs.

Other such system and method for judging boundary lines in court by video cameras exists (U.S. Pat. No. 6,816,185 of Harmath). This system continuously defines the trajectory of a tennis ball and detects a spot on the court where the ball bounces by locating within its trajectory a sudden change in direction and calculating coordinates of this change relative to boundaries of the court.

But such a system has essential drawbacks. First of all the notion itself of "a sudden change in direction within the trajectory" is defined unclearly and inexactly to be implemented reliably and with high precision. Then, because of geometry of watching, sudden change of trajectory of the tennis ball, caused by bouncing from court and seen by one or a few video cameras, may be so insignificant in some part of the court, that registration of this change will have low precision and reliability and will be often impossible (in connection with geometry of watching every video camera can have "blind" areas for registration of these changes). Building a system according to this patent may demand the use of extremely high speed and resolution video cameras (what was pointed out in the patent itself) and using possibly many video cameras. This may lead to higher processing power of computing system and make the described system in whole quite complex and expensive.

So there is a need for a relatively simple and inexpensive system for automatic judging of the tennis ball's bouncing position relative to boundary lines of court, where such a system would be affordable especially for numerous non professional tennis clubs.

This purpose is served by the present invention.

SUMMARY OF THE INVENTION

Accordingly, it is the objective of the present invention to provide a method and a system for real time judging of boundary lines on a tennis court during a tennis game, which avoid the disadvantages of the prior attempts.

More particularly, it is the objective of the present invention to provide a method and a system of the above mentioned type, which are simple and inexpensive and have a high enough accuracy and reliability in determining a position of bouncing of tennis ball relative to boundary lines of court.

For reaching these objectives the present invention provides a method and a system for real time judging boundary lines on tennis court in order to determine whether a tennis ball in play bounces in or out of court, using at least one video camera, sensitive to near-infrared radiation and outputting a video image of the court and at least one point source of near-infrared radiation, illuminating the court and displaced relative to the video camera.

In one aspect of the present invention it is suggested a new simple and inexpensive way of determining if a tennis ball bounces in or out of court by determining point of intersection of trajectories of the ball and its shade from near-infrared radiation relative to previously calibrated boundary lines of court.

In other aspect of the present invention the provided system for real time judging of boundary lines on a tennis court includes an image processing system with a computer generating an output signal through I/O interface if the tennis ball is determined to be out of court.

In other aspect of the present invention decreasing of cost of the system is reached further by using an incandescent bulb with near-infrared filters as simple and inexpensive point source of near-infrared radiation.

In other aspect of the invention a point source of modulated near-infrared light can be used for further increasing immunity to noise.

The novel features of the present invention are set forth in particular in the claims.

The invention itself, however, will be best understood from the following description of preferred embodiments, which is accompanied by the following drawings.

BRIEF DESCRIPTION OF THE DRAWINGS

These and other advantages of the invention will become apparent upon reading the following detailed description and upon referring to the drawings in which.

DETAILED DESCRIPTION OF THE PREFERRED EMBODIMENT

The present invention will now be described in detail with references to the drawings, which collectively illustrate a method and a system for real time judging boundary lines on a tennis court by location of bouncing points of a tennis ball relative to boundary lines of court according to the present invention.

Figure 1:
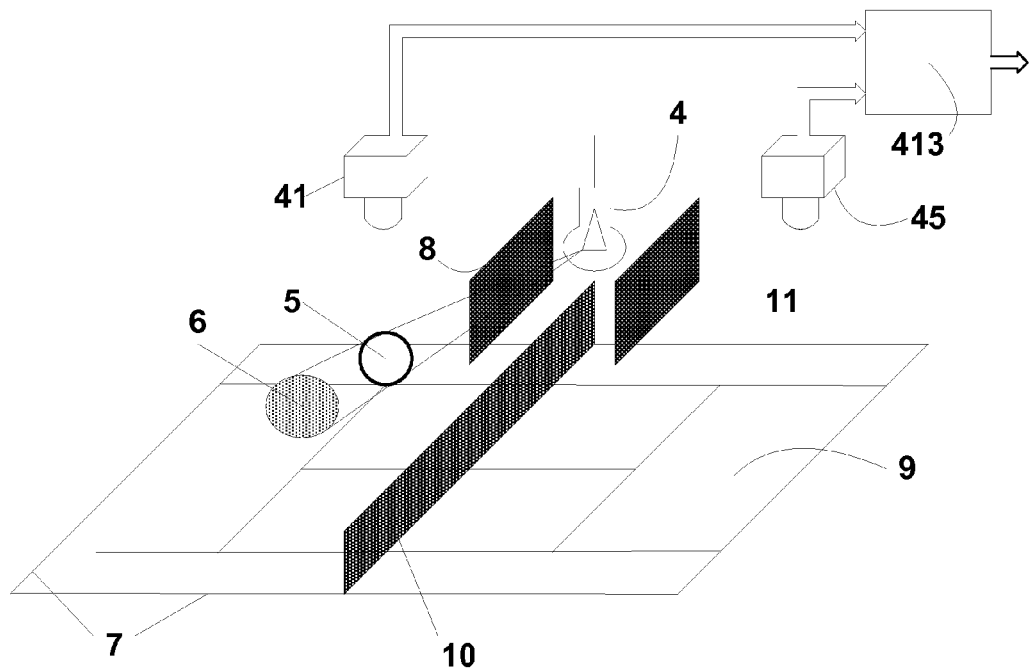
FIG. 1 is a perspective view of an embodiment of the invention on a tennis court.

FIG. 1 shows a perspective view of an embodiment of the method and system on a tennis court.

In the preferred embodiment two black and white video cameras 41 and 45 are used, where video camera 41 outputs video image of left half of the court 9 and video camera 45 outputs video image of right half of the court 9. The best positions of video cameras 41 and 45 are over the centers of left half of the court and right half of the court correspondingly on the height 5-10 m. One can be used one video camera or more than two, but using two video cameras is the best compromise between price of the system and resolution of the details of the court. Video cameras should be sensitive to near-infrared light and equipped with near-infrared filters for reason described below.

The video cameras 41 and 45 are connected to the image processing system 413, including computer and performing image processing. It is used also the point source 4 of near-infrared radiation, illuminating the court and displaced relatively to video cameras located, for example, over the net 10 of a tennis court on height 5-10 m. The point source 4 of near-infrared radiation should be displaced relative to the video cameras so that the shadow 6 of the tennis ball 5 "could be seen" by the video cameras (will not be hided by the tennis ball). One can use any point source of near-infrared radiation, but preferable is incandescent bulb 4 with near-infrared filters 8 and 11. Such an incandescent bulb with near-infrared filters is extremely cheap and can be considered as point source of light on distances more than 5-15 m.

The present invention suggests a new simple and inexpensive way of determining if a tennis ball bounces in or out of court. The method and system according to present invention are founded on the fact, that an image of tennis ball itself 5 (FIG. 1) will be superimposed on an image of tennis ball shadow 6 (FIG. 1) from point source near-infrared radiation in the moment of touching of surface of the court by the tennis ball (Illustration of these images themselves is shown on FIG. 2). So for location of bouncing point of tennis ball from court it is enough to register a point of intersection of trajectory of image of tennis ball itself with trajectory of the image of tennis ball shadow. Illuminating the court by near-infrared radiation for creating a shadow of the tennis ball was chosen, because it is invisible for players and will not blind them.

The near-infrared band around 850 nm for all used near-infrared filters is preferable, because, as was shown in experiments, on this wavelength there is sufficient contrast for a tennis ball and its shade relative to tennis court. Near-infrared filters (not shown) with which the video cameras should be equipped reject visual light in video images, because visual light can play role of noise in the described method and system.

The method and system according to present invention is intended for the most part for indoor courts, where usually there is scattered artificial illumination (no sun light), but the method and system can be modified for use with sun light in outdoor courts.

Latter goal can be reached by using a point source of modulated near-infrared light, which can emit constant pulses of light with frequency, for example, around 1000 Hz. Since video camera sensors operate as the exposition meter accumulating charge during video frame (approximately 1/30 sec by standard), in this case video image of court will contain "stroboscopic" (multiple) images of moving tennis ball and its shade in current frame—from the pulsed point source of near-infrared radiation. On the contrary the sun or other noise sources of near-infrared radiation will give continuous paths (traces) of moving tennis ball and its shade. So during image processing of video images of moving objects "stroboscopic" (true) trajectories can be distinguished from continuous trajectories (noisy), what will increase an immunity to noise and permit to work the system with the periodically vanishing sun in outdoor courts or with noise point sources of constant infrared radiation in indoor courts.

Modulated point source of near-infrared radiation can comprise, for example, incandescent bulb, electromechanical modulator of light (not shown), and near-infrared filters.

FIG. 1 shows not modulated point source of infrared radiation, because the preferred embodiment of the method and system is intended for the most part for indoor courts, most of which use scattered artificial illumination by fluorescent lamps, giving weak homogeneous background in near-infrared light (as was shown in experiments), so in the absence of essential noise in the preferred embodiment there is no need in modulated point source of near-infrared radiation and it is the best to use incandescent bulb 4 with near-infrared filters 8 and 11, as the constant point source of near-infrared radiation.

Figure 3:
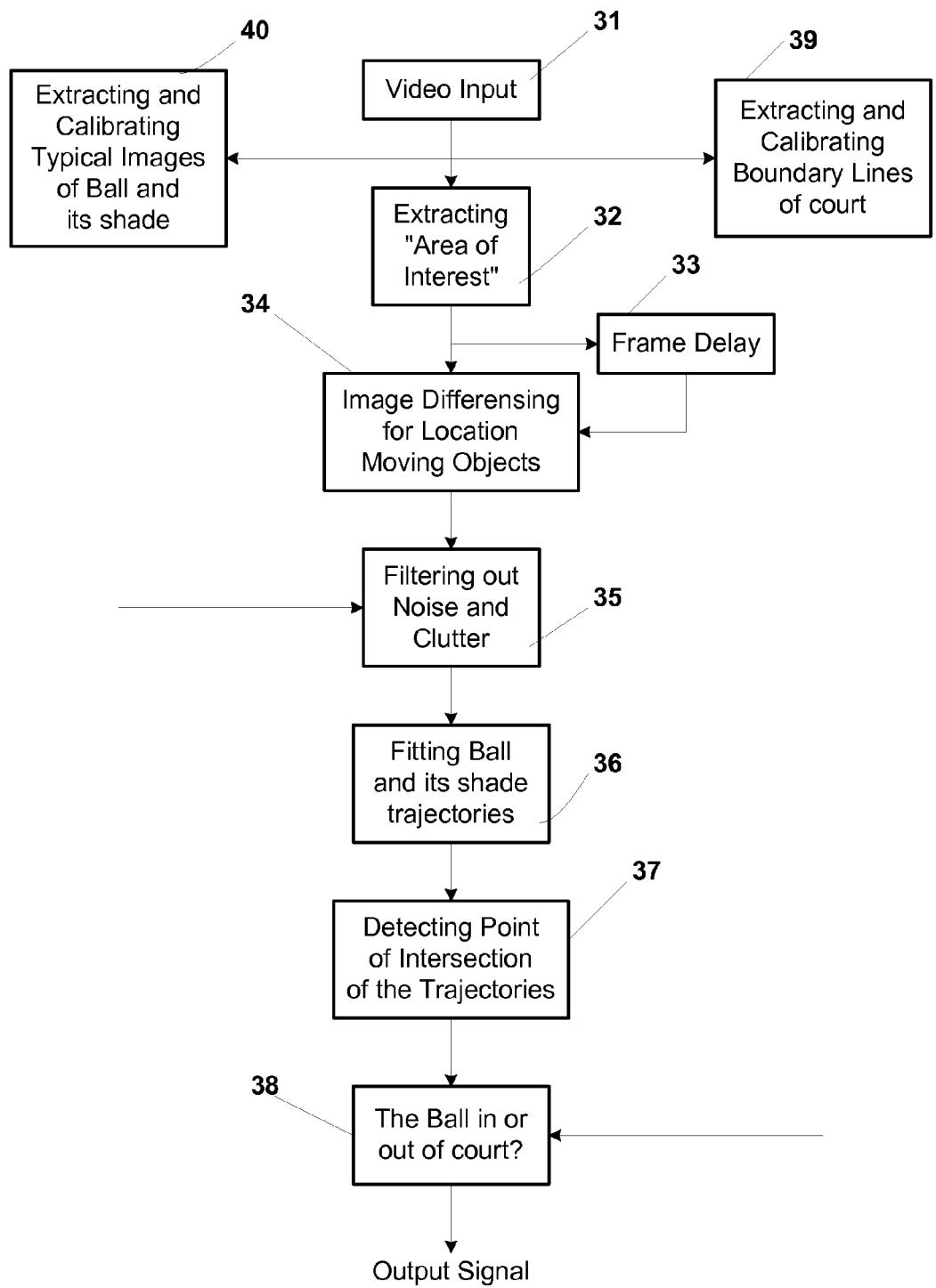
FIG. 3 is a block diagram of an image processing in the present invention.

Block diagram on FIG. 3 illustrates steps of image processing of video image from every video camera; in our case of preferred embodiment, it illustrates steps of processing for one (for example, left) of two video cameras.

As shown on block diagram FIG. 3 of image processing in present invention, video input 31 from left video camera goes to module 32 of extracting an "Area of Interest", which can output electronically "magnified" smaller part of an image of court with higher frame rates, what may be done in video camera digital system, controlled by a computer and described below.

According to the preferred embodiment of the present invention moving objects have to be extracted and located in frames of video image of every half of court. It can be done by different modern methods, but preferred is the method of differencing of current and previous frames, because it is fast, simple and inexpensive.

For doing this, video image of half of the court goes to frame delay module 33, which is simply a memory of frame. The memory of frame in frame delay module 33 stores previous video frame. Previous frame in module 34 is subtracted from current frame of video image, producing motion regions or moving objects in video image of a half of court. For differencing image to have only positive amplitudes, math operation of calculating absolute values of amplitudes may be applied to results of subtraction.

Figure 2:
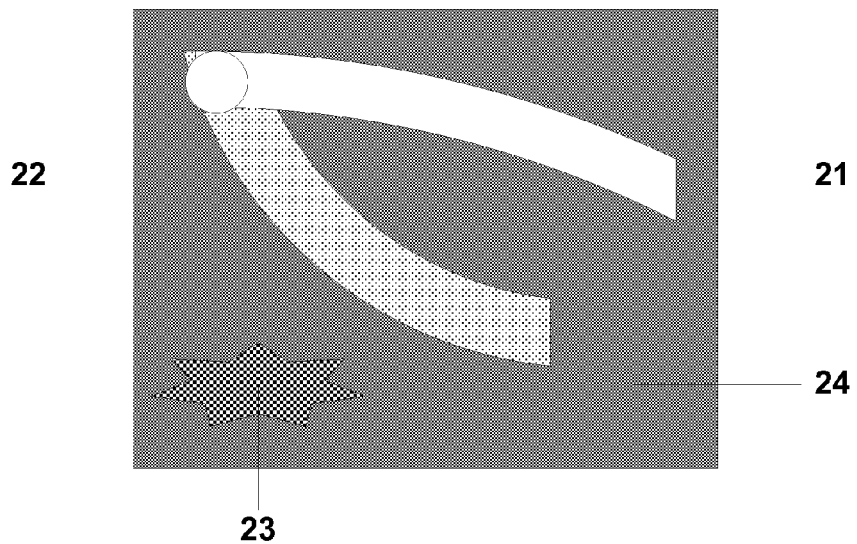
FIG. 2 is an illustration of a video image with typical moving objects.

FIG. 2 shows typical motion regions in differencing video image of a half of court. Most of the differencing image will be occupied by black background 24—result of self-differencing of motionless objects from themselves.

Only non black objects (motion regions) in differencing image, displaced during accumulation of charge in video camera during a frame, are trace (path) 21 of an image of moving tennis ball itself and trace (path) 22 of an image of moving shade of tennis ball from near-infrared radiation and random image 23 of moving tennis player (any moving object leaves a trace during frame accumulation of charge in video camera).

Because video camera sensors operate as exposition meter accumulating charge during video frame (approximately 1/30 sec by standard) and a tennis ball (with diameter approximately 6.5 cm) can move up to 2 m during the video frame (its speed is up to 60 m/sec), we will get an accumulated trace (path) 21 of tennis ball in differencing video image, which will be the arc of constant width and of length depending on speed of the ball.

Shadow of the tennis ball from near-infrared point source of radiation will produce similar arc (path) 22, but only lower intensity.

These two arcs should intersect only when a tennis ball touches surface of the court. Because there are noise and/or clutter images 23 in differencing image (for example, from moving player), it is necessary to filter out any non tennis ball or its shade objects amongst moving regions. It can be done by comparing in module 35 on FIG. 3 all moving objects with previously calibrated images of tennis ball and its shade from point source of near-infrared radiation and filtering out non ball and its shade images. These calibrated images of the ball and its shade could be derived on empty court before the game (module 40), where gray level range patterns of the ball and its shade may be recorded.

Next step in the image processing according to the present invention is fitting the trace (path) of the ball and the trace (path) of its shadow in two independent trajectories correspondingly (module 36).

Authors developed new, fast, simple and effective algorithm for filtering out any noise and clutter (not the ball and its shade) among video image of moving objects and simultaneous fitting the path of the ball and its shade in two independent trajectories. This algorithm may be used as addition to above mention comparing with calibrated images or can be used instead of it alone.

The above mentioned algorithm is suggested for processing of motion regions in differencing image in modules 35 and 36. Most of the pixels in differencing image are black (with close to 0 amplitude, background 24 on FIG. 2), so the algorithm is applied to relatively small motion regions with not 0 amplitude pixels (objects 21, 22, 23 on FIG. 2).

According to suggested algorithm:
  every not 0 amplitude pixel in a digital image of motion regions is considered having amplitude equal 0, if it doesn't have approximately equal amplitude pixels around it in circle with radius of image of tennis ball approximately;
  every remaining not 0 amplitude pixel is considered having amplitude equal to 0, if there are no pixels with the same amplitude in its closed proximity;
  remaining 2 arcs of pixels of lower and higher not 0 amplitudes are considered and fitted in trajectories of a shadow of the ball and the ball itself correspondingly.

Above written algorithm of discrimination and filtration is based on the facts, that the 2 trajectories are arcs of constant width (approximately equal to width of the image of tennis ball) and every arc has approximately equal amplitude for all its pixels.

Further the method specifies location of a point of intersection of the two trajectories 21 and 22 (FIG. 2), performed in module 37 on FIG. 3. As was explained above, coordinates of this point of intersection are coordinates of touching point of the ball and court.

After location of point of intersection (if there is any) it is made comparing the coordinates of the point of intersection with position of boundary lines of court (module 38, FIG. 3). Boundary lines of court 7 (FIG. 1) are extracted from calibration image of empty court before the game in module 39 (FIG. 3). As experiments show they have good contrast on court in near-infrared band and can be extracted by threshold processing of an image of empty court. Further these boundary lines of court are memorized during the game. And at last, after comparing the coordinates of the point of intersection of the 2 trajectories with position of boundary lines of court, the output signal for judge or players is produced (FIG. 3), with help of which one can evaluate, if the tennis ball bounced in court or out of court.

Figure 4:
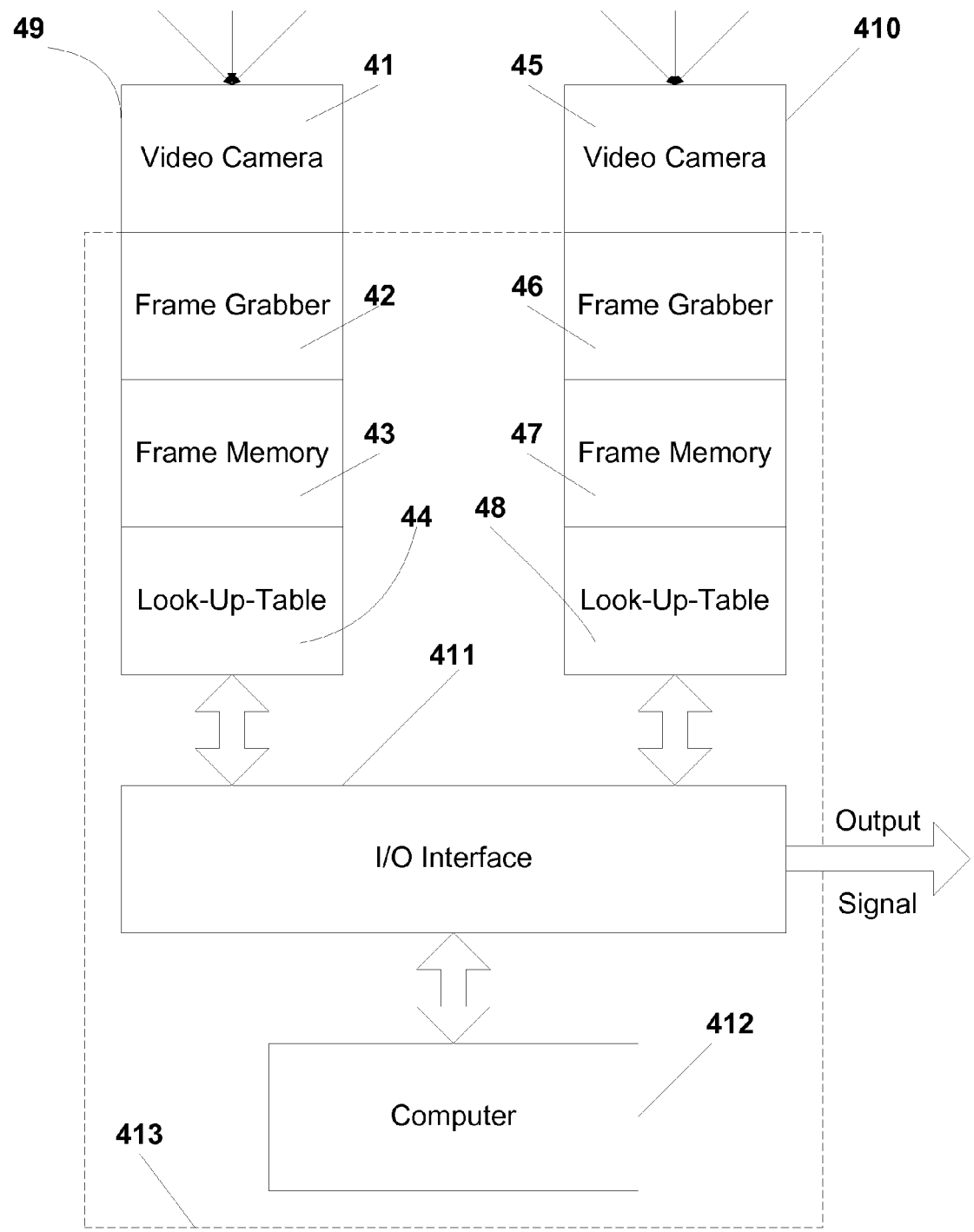
FIG. 4 is a schematic illustration of an example configuration of the system in the present invention.

FIG. 4 illustrates a schematic arrangement of a system according to the present invention.

Although one can use in the system any video cameras, sensitive to near-infrared light, it is preferable using of two video camera digital systems (modules 49 and 410), equipped with CMOS (Complementary Metal Oxide Semiconductor) sensors, sensitive to near-infrared radiation. Every video camera digital system (49 or 410) can contain in one small case the video camera 41 or 45 itself, the frame grabber 42 or 46, the frame memory 43 or 47, the look-up-table 44 or 48. Such a video camera digital system with CMOS sensor is cheaper, than with CCD (Charge-Coupled Device), and can perform more video adapting processing.

Video images of two halves of the court go from video cameras 41 and 45 to the image processing system 413 (as shown on FIG. 4), comprising frame grabbers 42 and 46, frame memories 43 and 47, look-up-tables 44 and 48, I/O (Input/Output) interface 411 and computer 412. Video camera digital systems 49 and 410 as whole are connected with a module of I/O interface 411, which in his turn is connected to computer 412. Described modules of image processing system 413 are configured to process frames of video images of court to locate moving objects, to discriminate among them the ball itself and its shadow from at least one point source of near-infrared radiation by comparison with previously calibrated images of the ball and its shade, to fit a path of the ball and a path of its shadow in two independent trajectories correspondingly, to detect a spot on the court where the ball bounces by locating a point of intersection of the two trajectories, to determine whether the ball is in or out of court by comparing coordinates of the spot with location of previously calibrated boundary lines of court; and to generate an output signal through I/O interface 411 if the ball is determined to be out of court.

For fast and effective location of moving objects the computer may calculate digital images of difference between "current frame" from video cameras 41 or 45 and "previous frame", stored in frame memories 43 or 47. Frame grabbers 42 or 46 perform digitizing of video images.

Before the game can be done calibration (extracting and memorizing) images of the tennis ball itself and its shadow from point source of near-infrared radiation with registration of gray level range patterns of the ball and its shade. Also before the game can be done calibration (extracting and memorizing) of boundary lines of court. All calibration data can be stored in permanent memory of the computer 412.

The computer then may program look-up-tables 44 and 48 with help of the gray level range pattern data of the ball and its shade so that these look-up-tables 44 and 48 discriminated the ball and its shade and filtered out any clutter in digital video image by histogram amplitude processing.

Using CMOS sensors (with random access to pixels) permits outputting of the "Area of Interest"–"magnified" smaller part of frame with higher frame rates in video cameras 41 and 45, controlled by feedback from the computer 412 with purpose to increase temporal resolution of the system according to the present invention. It may be needed for frames with highest speed of tennis ball.

Any point source of near-infrared radiation can be used in the system, but preferable is incandescent bulb with near-infrared filters, because it is wide available and extremely affordable (as was mentioned above).

An interface between video camera digital systems 49, 410 and I/O interface 411 of computer 412 can be widely available and cheap "USB" or "FireWire" interface.

Thus, it is evident that there has been provided in accordance with invention a method and system for real time judging boundary lines on tennis court, that fully satisfies the objects, goals and advantages set forth above. While the invention has been described in conjunction with illustrated embodiments thereof, it is evident that many alternatives, modifications and variations will be apparent to those skilled in the art. Accordingly, it is intended to embrace all such alternatives, modifications and variations as fall within the spirit and broad scope of the invention.

What is claimed is:

1. A method for real time judging boundary lines on a tennis court in order to determine whether a tennis ball in play bounces in or out of said court, said method using radiation at least one video camera outputting a video image of said court, said method using at least one said video camera sensitive to near-infrared radiation, and said method using at least one point source of near-infrared radiation, illuminating said court and displaced relative to said at least one video camera, said method comprising:

continuously obtaining frames of the video image of said court;

within said frames of the video image, locating moving objects;

comparing said moving objects to previously calibrated images of said tennis ball and its shadow from said at least one point source of near-infrared radiation so as to filter out any moving object which is not said tennis ball or its shadow and to distinguish said tennis ball and its shadow;

fitting a path of said tennis ball and a path of its shadow into two independent trajectories correspondingly;

detecting a spot on said court where said tennis ball bounces by locating a point of intersection of said two trajectories;

determining whether said tennis ball is in or out of the court by comparing coordinates of said spot with a location of previously calibrated boundary lines of the court;

and generating an output signal if said tennis ball is determined to be out of the court, wherein said step of comparing said moving objects to previously calibrated images of said tennis ball and its shadow from said at least one point source of near-infrared radiation so as to filter out any moving object which is not said tennis ball or its shadow and to distinguish said tennis ball and its shadow, and said step of fitting a path of said tennis ball and a path of its shadow into two independent trajectories correspondingly, further comprise:

in a digital image of moving objects, an amplitude of every non-zero amplitude pixel is set equal to zero, if said pixel does not have approximately equal amplitude pixels around it in a circle having said pixel in the center of said circle, and said circle having a radius approximately equal to the radius of the image of said tennis ball;

an amplitude of each remaining non-zero amplitude pixel is set equal to zero, if there are no pixels with the same amplitude in closest proximity of said each remaining non-zero amplitude pixel; and remaining two arcs of pixels of higher and lower amplitudes are considered trajectories of said tennis ball and its shadow correspondingly.

2. A system for real time judging boundary lines on a tennis court in order to determine whether a tennis ball in play bounces in or out of said court, said system comprising at least one video camera outputting a video image of said court, said system using at least one said video camera sensitive to near-infrared radiation, and said system using at least one point source of near-infrared radiation illuminating said court and displaced relative to said at least one video camera, and said system further comprising an image processing system including: at least one frame grabber, connected to a corresponding video camera, at least one frame memory, at least one look-up-table, and a computer, connected by an I/O interface, said image processing system configured to process frames of the video image of said court to locate moving objects, to discriminate among said moving objects said tennis ball and its shadow from at least one point source of near-infrared radiation by comparison with previously calibrated images of said tennis ball and its shadow, to fit a path of said tennis ball and a path of its shadow into two independent trajectories correspondingly, to detect a spot on said court where said tennis ball bounces by locating a point of intersection of two said trajectories, to determine whether said tennis ball is in or out of said court by comparing coordinates of said spot with a location of previously calibrated boundary lines of said court; and to generate an output signal through said I/O interface if said tennis ball is determined to be out of said court, wherein said steps of discriminating said tennis ball and its shadow and fitting a path of said tennis ball and a path of its shadow into two independent trajectories correspondingly, further comprise:

in a digital image of moving objects, an amplitude of every non-zero amplitude pixel is set equal to zero, if said pixel does not have approximately equal amplitude pixels around it in a circle having said pixel in the center of said circle, and said circle having a radius approximately equal to the radius of the image of said tennis ball;

an amplitude of each remaining non-zero amplitude pixel is set equal to zero, if there are no pixels with the same amplitude in closest proximity of said each remaining non-zero amplitude pixel; and remaining two arcs of pixels of higher and lower amplitudes are considered trajectories of said tennis ball and its shadow correspondingly.

* * * * *